US012142448B2

(12) United States Patent
Hammer et al.

(10) Patent No.: US 12,142,448 B2
(45) Date of Patent: Nov. 12, 2024

(54) SWITCH FOR AN ON-LOAD TAP CHANGER AND LOAD TRANSFER SWITCH FOR AN ON-LOAD TAP CHANGER

(71) Applicant: Maschinenfabrik Reinhausen GmbH, Regensburg (DE)

(72) Inventors: Christian Hammer, Regensburg (DE); Silke Wrede, Zeitlarn (DE); Markus Zintl, Mitterteich (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 105 days.

(21) Appl. No.: 17/760,100

(22) PCT Filed: Jan. 29, 2021

(86) PCT No.: PCT/EP2021/052053
§ 371 (c)(1),
(2) Date: Aug. 4, 2022

(87) PCT Pub. No.: WO2021/170340
PCT Pub. Date: Sep. 2, 2021

(65) Prior Publication Data

US 2023/0045653 A1 Feb. 9, 2023

(30) Foreign Application Priority Data

Feb. 27, 2020 (DE) ..................... 10 2020 105 113.1

(51) Int. Cl.
*H01H 9/38* (2006.01)
*H01H 9/00* (2006.01)
(Continued)

(52) U.S. Cl.
CPC ........ *H01H 9/0016* (2013.01); *H01H 9/0027* (2013.01); *H01H 9/38* (2013.01);
(Continued)

(58) Field of Classification Search
None
See application file for complete search history.

(56) References Cited

U.S. PATENT DOCUMENTS 3,215,803 A * 11/1965 Goodwin, Jr. ......... H01H 9/386 335/196
3,433,915 A 3/1969 Baird et al.
(Continued)

FOREIGN PATENT DOCUMENTS

DE 2329562 A1 1/1975
DE 102014107273 A1 11/2015
WO WO 2017036496 A1 3/2017

*Primary Examiner* — Felix O Figueroa
(74) *Attorney, Agent, or Firm* — LEYDIG, VOIT & MAYER, LTD.

(57) ABSTRACT

An on-load tap-changer of a tap-changing transformer has a switch. The switch has: a take-off contact; a primary fixed contact; and a contact unit. The contact unit has a moving contact, a first arcing contact and a second arcing contact. These contacts are pivotable about a pivot axis during a switchover process such that the contacts assume a first position, in which they make contact with the take-off contact and the primary fixed contact, and a second position, in which they are separated from the take-off contact and the primary fixed contact. The second arcing contact assumes the first position before the first arcing contact when switching over from the second position to the first position and leaves the first position after the first arcing contact when switching over from the first position to the second position.

16 Claims, 4 Drawing Sheets

(51) Int. Cl.
*H01H 9/40* (2006.01)
*H01H 33/66* (2006.01)

(52) U.S. Cl.
CPC .............. *H01H 9/40* (2013.01); *H01H 33/66* (2013.01); *H01H 2009/0022* (2013.01)

(56) References Cited

U.S. PATENT DOCUMENTS

| | | | | |
|---|---|---|---|---|
| 3,691,511 | A * | 9/1972 | Billmann ............... | H01R 13/53 439/181 |
| 11,120,962 | B2 * | 9/2021 | Schmidt ............... | H01H 9/0027 |
| 2020/0168420 | A1 | 5/2020 | Schmidt et al. | |

* cited by examiner

SWITCH FOR AN ON-LOAD TAP CHANGER AND LOAD TRANSFER SWITCH FOR AN ON-LOAD TAP CHANGER

CROSS REFERENCE TO RELATED APPLICATIONS

This application is a U.S. National Phase application under 35 U.S.C. § 371 of International Application No. PCT/EP2021/052053, filed on Jan. 29, 2021, and claims benefit to German Patent Application No. DE 10 2020 105 113.1, filed on Feb. 27, 2020. The International Application was published in German on Sep. 2, 2021 as WO 021/170340 A1 under PCT Article 21(2).

FIELD

The present disclosure relates to a switch for an on-load tap-changer of a tap-changing transformer and to a diverter switch for an on-load tap-changer of a tap-changing transformer.

BACKGROUND

German patent application DE 10 2014 107 273 A1 discloses a switch for a diverter switch of an on-load tap-changer having a take-off contact, a primary fixed contact and a plurality of primary moving contacts, which are arranged in a stack in a contact carrier. In addition, the switch comprises two structurally identical primary arcing contacts.

On-load tap-changers usually consist of a selector for power-free selection of the respective winding tap of the transformer to which a switchover is intended to be made, and a diverter switch for the actual load switchover from the previous winding tap to the new, selected winding tap. The switchover takes place by actuating different switches. This regularly produces arcs at the switching contacts, which melt or burn small amounts of the contact material and thus lead to contact wear. The wear is dependent on the current intensity and the duration of the arc at the respective contact. As the load increases, that is to say at relatively high currents and voltages, the demands on the switches and contacts are consequently also increased.

SUMMARY

In an embodiment, the present disclosure provides a switch for an on-load tap-changer of a tap-changing transformer. The switch has: a take-off contact; a primary fixed contact; and at least one contact unit. The contact unit has a plurality of contacts including a moving contact, a first arcing contact and a second arcing contact. The plurality of contacts are configured to be pivoted about a pivot axis during a switchover process of the switch in such a way that the plurality contacts can each assume a first position, in which the plurality of contacts respectively make contact with the take-off contact and the primary fixed contact, and a second position, in which the plurality of contacts respectively are separated from the take-off contact and the primary fixed contact. The second arcing contact is configured to assume the first position before the first arcing contact when switching over from the second position to the first position and is configured to leave the first position after the first arcing contact when switching over from the first position to the second position.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
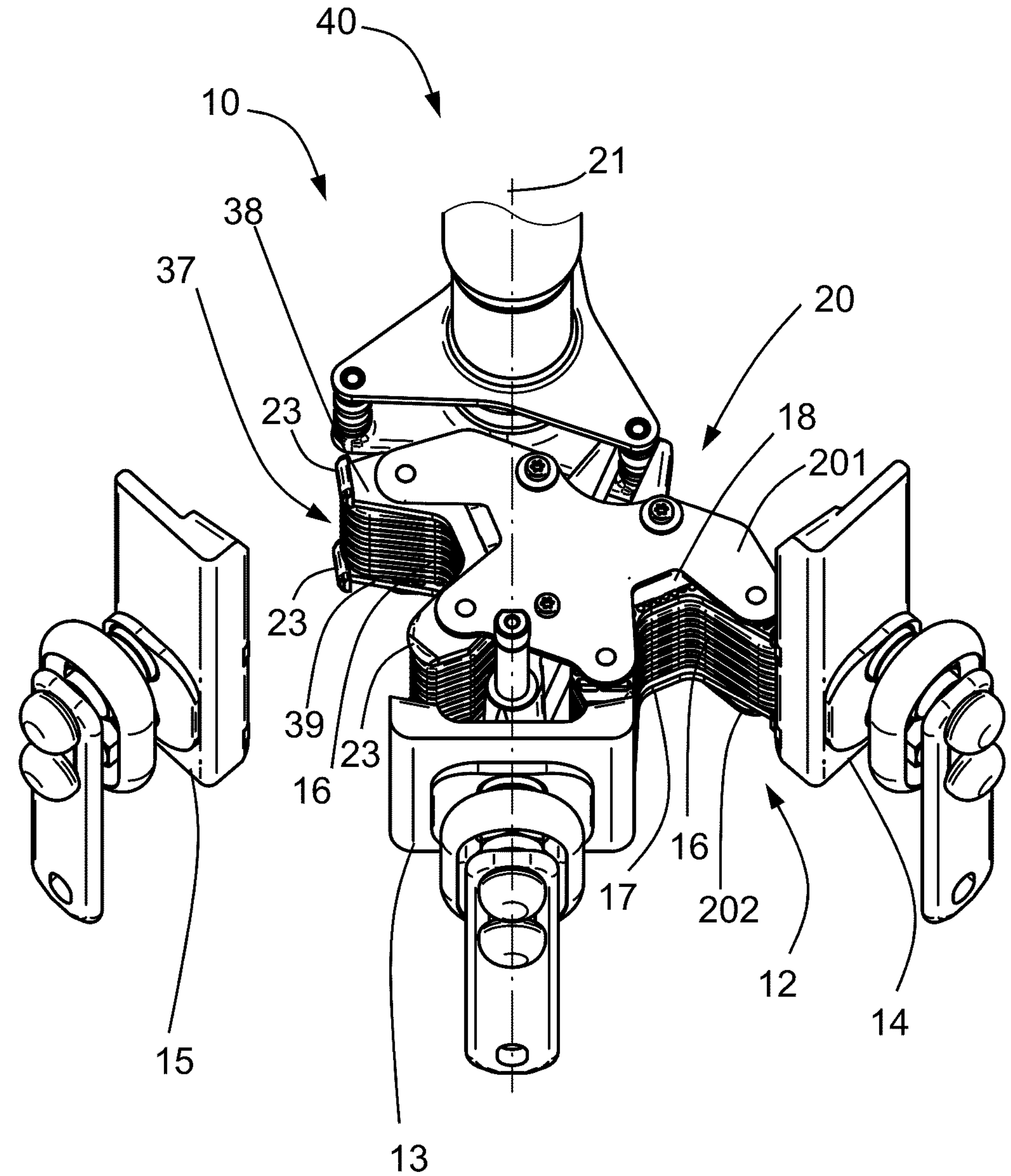
FIG. 1 shows a perspective view of an advantageous embodiment of a switch for an on-load tap-changer.

Aspects of the present disclosure provide an improved switch for an on-load tap-changer and an improved diverter switch for a tap changer which withstands the increased loads at relatively high currents and voltages.

According to a first aspect of the present disclosure, a switch for or in an on-load tap-changer of a tap-changing transformer is provided. The switch comprises a take-off contact, a primary fixed contact and at least one contact unit. The contact unit has at least one moving contact, a first arcing contact and a second arcing contact, which contacts can be jointly pivoted about a pivot axis during a switchover process of the switch in such a way that they can each assume a first position, in which they make contact with the take-off contact and the primary fixed contact, and a second position, in which they are separated from the take-off contact and the primary fixed contact. The second arcing contact assumes the first position before the first arcing contact when switching over the contact unit from the second position to the first position and the second arcing contact leaves the first position after the first arcing contact when switching over from the first position to the second position.

The temporally successive processes of the first and the second arcing contact assuming and leaving the first position causes the current to be switched off to be, as it were, “transferred” from one arcing contact to the other. In technical terms, this process is also called “commutation”. In more general terms, “commutation” is therefore understood to mean the transfer of a current from one current branch to another current branch, with both branches carrying current during the commutation time.

According to at least one embodiment, the first arcing contact assumes the first position before the at least one moving contact when switching over the contact unit from the second position to the first position and the first arcing contact leaves the first position after the at least one moving contact when switching over from the first position to the second position.

In this way, a further commutation stage is created and the duration of the arc and the contact wear on the moving contact and the arcing contacts are further reduced.

This multi-stage commutation has the advantage that the duration of an arc at the first and the second arcing contact or the moving contact is shortened, and therefore the contact wear at the first and the second arcing contact or the moving contact is also reduced.

According to at least one embodiment, the moving contact, the first arcing contact and the second arcing contact consist of different conductive materials which have a different conductivity.

The moving contact preferably consists of copper, the first arcing contact preferably consists of brass and the second arcing contact preferably consists of stainless steel.

The contact wear can be influenced by the choice of material due to the properties of the material. In particular, it is important for the contacts to wear uniformly, so that the staggering of the contact-making and lifting-off points over time and the sequence of contact-making and lifting-off operations of the moving contact, the first arcing contact and the second arcing contact are maintained. This is because otherwise there may be faults and malfunctions on the switch and consequently on the entire on-load tap-changer.

According to at least one embodiment, the moving contact and/or the first arcing contact and/or the second arcing contact have a different geometric shape.

In particular, the cross section of the respective contact through which the current flows can be reduced by providing cutouts in an arcing contact and/or a moving contact. This has the advantage that the electrical conductivity of the arcing contacts and/or of the moving contact can optionally be further adjusted by means of the geometric shape of the contacts in order to achieve uniform wear.

According to at least one further embodiment, the at least one moving contact, the first arcing contact and the second arcing contact each have two contact regions by way of which they rest against the take-off contact and the associated fixed contact in the first position.

At least one of the two contact regions can consist of a material that differs from the material of the rest of the contact, for example of an arc-resistant copper-tungsten sintered material.

According to at least one embodiment, the first arcing contact and the second arcing contact are arranged relative to the moving contact in such a way that at least one contact region of the first arcing contact and/or of the second arcing contact protrudes in relation to the contact regions of the moving contact in the second position.

According to at least one embodiment, the second arcing contact is arranged relative to the first arcing contact in such a way that at least one contact region of the second arcing contact protrudes in relation to the contact regions of the first arcing contact in the second position.

A contact region that protrudes in relation to the other contact regions causes the corresponding contact to meet the take-off contact and/or the primary fixed contact earlier than the contacts that have no contact region or a less protruding contact region when switching over to the first position and also again leaves the take-off contact and/or the primary fixed contact later in the return movement when switching over from the first position to the second position. As a result, the duration of an arc on a contact and the contact wear can be influenced.

According to at least one embodiment, the switch comprises a contact carrier which is mounted pivotably about the pivot axis and has a first supporting plate and a second supporting plate which is arranged parallel to the first supporting plate. Furthermore, the contact carrier comprises at least one further moving contact, wherein the moving contacts, the first arcing contact and the second arcing contact are arranged between the supporting plates. The moving contacts are preferably identical to one another in shape and material.

According to at least one embodiment, the moving contacts and the first arcing contact and the second arcing contact are arranged in a stack in the contact carrier. For fastening in the contact carrier, the moving contacts, the first arcing contact and the second arcing contact each have two parallel elongate holes situated one above the other. They are fitted movably between the supporting plates by means of guide pins which pass through the elongate holes.

The moving contacts, the first arcing contact and the second arcing contact can be arranged in a stack spaced apart from one another by disks which lie between the individual contacts and are pushed onto the guide pins.

According to at least one embodiment, the guide pins together with the elongate holes, during the switchover process of the switch, form a mechanical stop for the moving contacts and the first and the second arcing contact in relation to the force exerted by compression springs which are arranged on the back surfaces, facing away from the contact regions, of the contacts.

According to at least one embodiment, the elongate holes of the moving contacts, of the first arcing contact and of the second arcing contact are each of different lengths in such a way that the moving contacts, the first arcing contact and the second arcing contact each reach the mechanical stop at different points in time during the switchover process of the switch or of the contact unit from the second to the first position and/or from the first to the second position. Provision can be made for the elongate holes of the first arcing contact to be shorter than the elongate holes of the second arcing contact and longer than the elongate holes of the moving contacts.

In the second position, the moving contacts and the first and the second arcing contacts each rest against the guide pins by way of the ends, facing away from the contact regions, of the elongate holes. This can cause the second arcing contact to protrude further beyond the guide pins than the first arcing contact, and this in turn protrudes further than the moving contacts. As a result, the moving contacts, the first arcing contact and the second arcing contact reach the take-off contact and the primary fixed contact one after the other during the switchover process of the switch or the contact unit from the second to the first position and also leave the take-off contact and the primary fixed contact again one after the other when switching over from the first position to the second position.

According to at least one embodiment, the moving contacts, the first arcing contact and the second arcing contact are arranged on the contact carrier in such a way that they are preloaded in a resilient manner against the take-off contact and the primary fixed contact in the first position.

According to at least one embodiment, the moving contacts, the first arcing contact and the second arcing contact are arranged in a stack in such a way that the moving contacts are arranged between the first arcing contact and the second arcing contact. In principle, however, any possible arrangement of the contacts in a stack is possible.

According to at least one embodiment, the switch comprises a secondary fixed contact and a second contact unit which, with respect to an axis of symmetry which runs through the pivot axis, is arranged symmetrically to the contact unit.

The second contact unit is constructed analogously to the first contact unit and accordingly has a third arcing contact, which is identical to the first arcing contact, and a fourth arcing contact, which is identical to the second arcing contact. The fourth arcing contact lies on a plane with the first arcing contact and the third arcing contact lies on a plane with the second arcing contact.

According to at least one embodiment, the switch is in the form of a permanent main switch or in the form of a disconnecting switch for or in a diverter switch of an on-load tap-changer.

According to a second aspect of the present disclosure, the object mentioned at the outset is achieved by a diverter switch for or in an on-load tap-changer of a tap-changing transformer. The diverter switch has a switch designed according to the first aspect of the present disclosure with at least one contact unit. In addition, the diverter switch has a first current path which comprises the moving contact of the contact unit of the switch, a second current path which comprises the first arcing contact of the switch, a third current path which comprises the second arcing contact of the switch, a fourth current path which comprises at least one vacuum interrupter and a fifth current path which connects the switch to a take-off lead.

The first current path has a particular resistance which results from the specific resistance of the material from which the moving contacts are composed. The second current path has a resistance which is greater than the resistance of the first current path and the third current path has a resistance which is greater than the resistance of the second current path. By designing the resistances of the current paths using the designated procedure, low and largely uniform wear of the contacts of the switch is made possible with multi-stage commutation of the load current.

According to a preferred embodiment, the resistances of the second and of the third current path can be determined using the material of the respective arcing contact or the specific resistance of the material from which the respective arcing contact, which is a constituent part of the path, is composed and/or using the geometric shape of said arcing contact.

The resistance of the fourth current path results, in some cases, from the material of the contacts or the specific resistance of the material of the contacts of the at least one vacuum interrupter, the fourth current path comprising said vacuum interrupter.

The resistance of the fifth current path results from the material of the line or the specific resistance of the material from which the line that connects the switch to the take-off lead is composed.

According to a preferred embodiment, the diverter switch has a switch with a second contact unit, wherein the diverter switch has at least three further current paths which comprise the moving contacts of the second contact unit and a third arcing contact and a fourth arcing contact of the second contact unit and which are designed analogously to the first, the second and the third current path.

According to a further preferred embodiment, the diverter switch has a switch with a second contact unit, wherein the diverter switch has five further current paths which are designed analogously to the first, the second, the third, the fourth and the fifth current path.

Further features, advantages and possible applications of the present disclosure can be found in the following description of the exemplary embodiments and in the figures. Here, all features described and/or illustrated in the figures form the subject matter of the present disclosure alone and in any desired combination even irrespective of their composition in the individual claims or their dependency references.

Components which are identical or functionally identical or which have an identical effect may be provided with identical reference signs. Identical components or components with an identical function are in some cases explained only in relation to the figure in which they first appear. The explanation is not necessarily repeated in the subsequent figures.

FIG. 1 shows a perspective view of an advantageous embodiment of a switch 10 for an on-load tap-changer 40. In this embodiment, the switch 10 comprises a take-off contact 13, a primary fixed contact 14 and a secondary fixed contact 15. Furthermore, the switch 10 has a first contact unit 12, which is in a first position in which it makes contact with the take-off contact 13 and the primary fixed contact 14, and a second contact unit 37, which is in a second position in which it is separated from the take-off contact 13 and the secondary fixed contact 15. The contact units 12, 37 are arranged in a contact carrier 20 and mounted pivotably relative to the take-off contact 13 and the fixed contacts 14, 15 about a pivot axis 21 in such a way that they can each assume the first position and the second position. The first contact unit 12 comprises a contact stack with a first arcing contact 17, a second arcing contact 18 and a plurality of moving contacts 16 arranged between the arcing contacts 17 and 18. The second contact unit 37 likewise comprises a contact stack with a third arcing contact 38, a fourth arcing contact 39 and a plurality of moving contacts 16 situated between the arcing contacts 38 and 39. The take-off contact 13, the fixed contacts 14, 15 and the moving contacts 16, which are structurally identically to one another, consist of copper. The first and the third arcing contact 17, 38 are structurally identically to one another and consist of brass. The second and the fourth arcing contact 18, 39 are likewise structurally identical to one another and consist of stainless steel.

The contact carrier 20 has a first supporting plate 201 and a second supporting plate 202, between which the contact stacks of the two contact units 12 and 37 are arranged. The supporting plates 201, 202 are structurally identical, arranged parallel and in alignment one above the other and consist of metal. The arcing contacts 17, 18, 38, 39 each have contact regions 23 by way of which they rest on the take-off contact 13 and one of the fixed contacts 14 and 15 in the first position. Based on the second contact unit 37, which is in the second position, it can be seen that the contact regions 23 on the outside with respect to the pivot axis 21 are at a greater distance from the fixed contacts 14 or 15 than the contact regions 23 on the inside are from the take-off contact 13.

Figure 2:
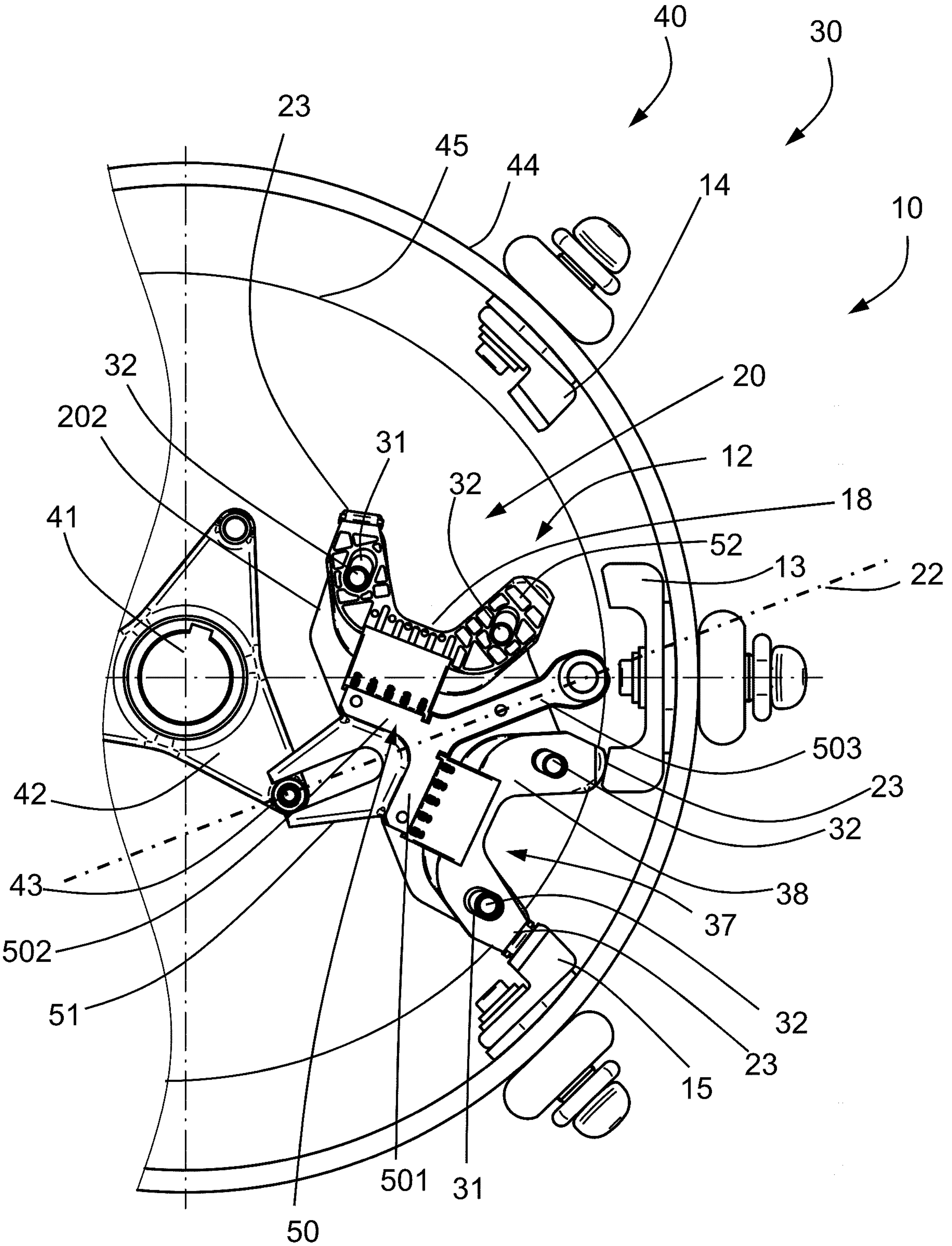
FIG. 2 shows a plan view of an advantageous embodiment of a diverter switch for an on-load tap-changer, which comprises the switch of FIG. 1.

FIG. 2 shows a plan view of an advantageous embodiment of a diverter switch 30 for an on-load tap-changer 40, which comprises the switch 10 from FIG. 1. Here, the contact unit 37 is in the first position and the contact unit 12 is in the second position. The supporting plate 201 is hidden in FIG. 2, so that the internal structure of the contact carrier 20 can be seen. The two contact units 12 and 37 are arranged symmetrically to one another with respect to an axis of symmetry 22 in the contact carrier 20.

In this embodiment, the on-load tap-changer 40 comprises the diverter switch 30, a switching shaft 41 for driving the switch 10, and a contact cylinder 44 through which the switching shaft 41 runs coaxially. The take-off contact 13 and the fixed contacts 14, 15 are routed through the contact cylinder 44 and fastened to it. The contact carrier 20 comprises a lever 50 with arms 501, 502, 503 arranged in a Y-shape and a fork 51. The lever 50 is arranged between the supporting plates 201, 202 and fastened to them by way of a plurality of pins which pass through the free ends of the side arms 501, 502 and a central portion of the central arm 503. The fork 51 is fixed to the lever 50 between the two side arms 501, 502 on the side averted from the central arm 503 and has an elongate hole which runs in extension of the central arm 503 and is open at its outer end remote from the lever 50. The contact stacks 16/17/18 and 16/38/39 are fitted movably to the supporting plates 201, 202 by way of in each case two guide pins 32 which pass through parallel elongate holes 31 in the contact stacks 16/17/18, 16/38/39 and consist of metal. The free end of the central arm 503 is mounted pivotably about the pivot axis 21. Therefore, the supporting plates 201, 202 and consequently also the contact carrier 20, the fork 51 and the contact stacks 16/17/18, 16/38/39 are mounted pivotably about the pivot axis 21 relative to the take-off contact 13 and the fixed contacts 14, 15. The contact stacks 16/17/18, 16/38/39 and the contact carrier 20 therefore form a one-sided lever in relation to the pivot axis 21.

The contact stacks 16/17/18, 16/38/39 are arranged symmetrically to the lever 50 on both sides of the central arm 503 and are supported by way of their back surfaces, facing away from the contact regions 23, via compression springs (FIGS. 3A and 3B) on the side arms 501, 502. As a result, the contact stacks 16/17/18, 16/38/39 are fitted to the contact carrier 20 in such a way that they are they are each preloaded in a resilient manner against the take-off contact 13 and the associated fixed contact 14, 15 in their first position.

The guide pins 32 together with the elongate holes 31 form a mechanical stop for the moving contacts 16 and the first, the second, the third and the fourth arcing contact 17, 18, 38, 39 against the force exerted on them by the compression springs (FIGS. 3A and 3B) during the switchover process of the switch 10, that is to say during the pivoting movement of the contact stacks 16/17/18, 16/38/39. Here, the elongate holes 31 of the moving contacts 16, those of the first and of the third arcing contact 17, 38 and those of the second and of the fourth arcing contact 18, 39 are each of different lengths. The elongate holes of the second and of the fourth arcing contact 18, 39 are the longest. Specifically, this means that the second arcing contact 18 reaches the take-off contact 13 and the primary fixed contact 14 as the last contact of the contact stack 16/17/18 during a switchover process of the first contact stack 16/17/18 from the second to the first position and also leaves them again as the last contact of the contact stack 16/17/18 during a switchover process from the first position to the second position. The elongate holes of the first and of the third arcing contact 17, 38 are shorter than the elongate holes of the second and of the fourth arcing contact 18, 39 and longer than the elongate holes of the moving contacts 16. Specifically, this means that the first arcing contact 17 reaches the take-off contact 13 and the primary fixed contact 14 after the second arcing contact 18 and before the moving contacts 16 during a switchover process of the first contact stack 16/17/18 from the second to the first position and leaves them again after the moving contacts 16 but before the second arcing contact 18.

The diverter switch 30 further comprises a base plate 45 of a frame, a triangular driver 42 and a drive roller 43. The switching shaft 41 and the lever 50 are mounted rotatably on the base plate 45. The driver 42 is seated non-rotatably on the switching shaft 41 and supports the drive roller 43 in one corner. The drive roller 43 is seated displaceably in the elongate hole of the fork 51, so that a rotation of the switching shaft 41, via the driver 42, the drive roller 43 and the fork 51, pivots the lever 50 in the opposite direction about the pivot axis 21 and this pivoting movement is transferred to the contact stacks 16/17/18, 16/38/39 via the plurality of pins, the supporting plates 201, 202 and the four guide pins 32.

Figure 3B:
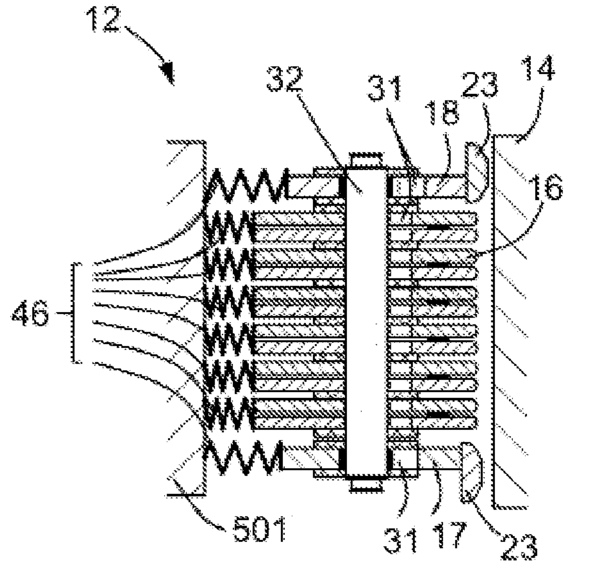
FIG. 3B shows a partial sectioned view of the switch from FIG. 1 in a first position.
Figure 3A:
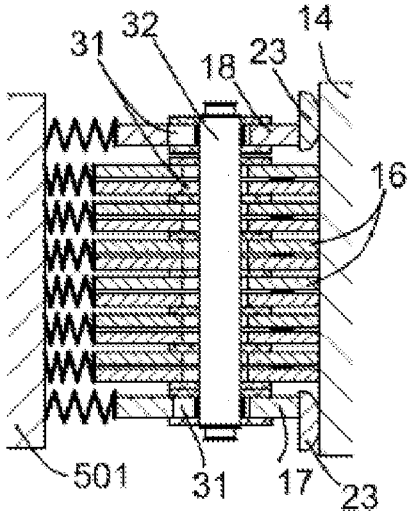
FIG. 3A shows a partial sectioned view of the switch from FIG. 1 in a second position.

In FIG. 2, the diverter switch 30 is in a stationary position, in which the drive roller 43 is seated at the outer end of the elongate hole in the fork 51. The drive roller 43 presses the contact stack 16/38/39 against the take-off contact 13 and the fixed contact 15 via the two guide pins 32 associated with it. The mechanical stop, formed by the elongate holes 31 and the guide pins 32, for the moving contacts 16 and the arcing contacts 38 and 39 on the side facing the take-off contact 13 and the fixed contact 15 is reached. The contact stack 16/17/18 separated from the take-off contact 13 and the fixed contact 14 is pressed against the two guide pins 32 associated with it by the compression springs associated with it (FIGS. 3A and 3B). Therefore, the moving contacts 16 are electrically conductively connected to one another and to the arcing contacts 17, 18. The same applies analogously when the contact stack 16/38/39 is separated from the take-off contact 13 and the fixed contact 15.

The contact stacks 16/17/18, 16/38/39 are arranged symmetrically to the lever 50 on both sides of the central arm 503 in such a way that the fourth arcing contact 39 lies on a plane with the first arcing contact 17 and the third arcing contact 38 lies on a plane with the second arcing contact 18. The second and fourth arcing contacts 18, 39 have a plurality of cutouts 52 in the stainless steel contact carrier, similar to a honeycomb structure, which increases the resistance of the arcing contacts or reduces the electrical conductivity.

FIGS. 3A and 3B show a partial sectioned view of the switch 10 from FIGS. 1 and 2, in particular the contact stack 16/17/18 of the contact unit 12 in the region situated on the outside with respect to the pivot axis 21. Said figures show the contact stack 16/17/18 in the second position on the left and in the first position on the right. The compression springs 46 are arranged between the back surfaces of the first arcing contact 17, of the second arcing contact 18 and of the moving contacts 16 and the side arm 501. On the left-hand side, the guide pin 32 rests against the elongate holes 31 of the contacts on the side averted from the fixed contact 14 and, on the right-hand side, the guide pin 32 rests against the elongate holes 31 of the contacts on the side facing the fixed contact 14. It can be seen on both sides that the elongate hole 31 of the second arcing contact 18 is the longest and the elongate hole 31 of the first arcing contact 17 is shorter than that of the first arcing contact 18, but longer than the elongate hole of the moving contacts 16.

In the second position, shown on the left-hand side, the compression springs 46 press the contact stack 16/17/18 against the guide pin 32. On account of the different lengths of the elongate holes 31, the contact region 23 of the second arcing contact protrudes in relation to the contact regions 23 of the first arcing contact 17 and of the moving contacts 16. The contact region 23 of the first arcing contact 17 projects in relation to the contact regions 23 of the moving contacts 16.

The contact stack 16/38/39 is constructed analogously, except for the first and the second arcing contact 38 and 39 which are arranged in a manner swapped in relation to the contact stack 16/17/18.

Figure 4:
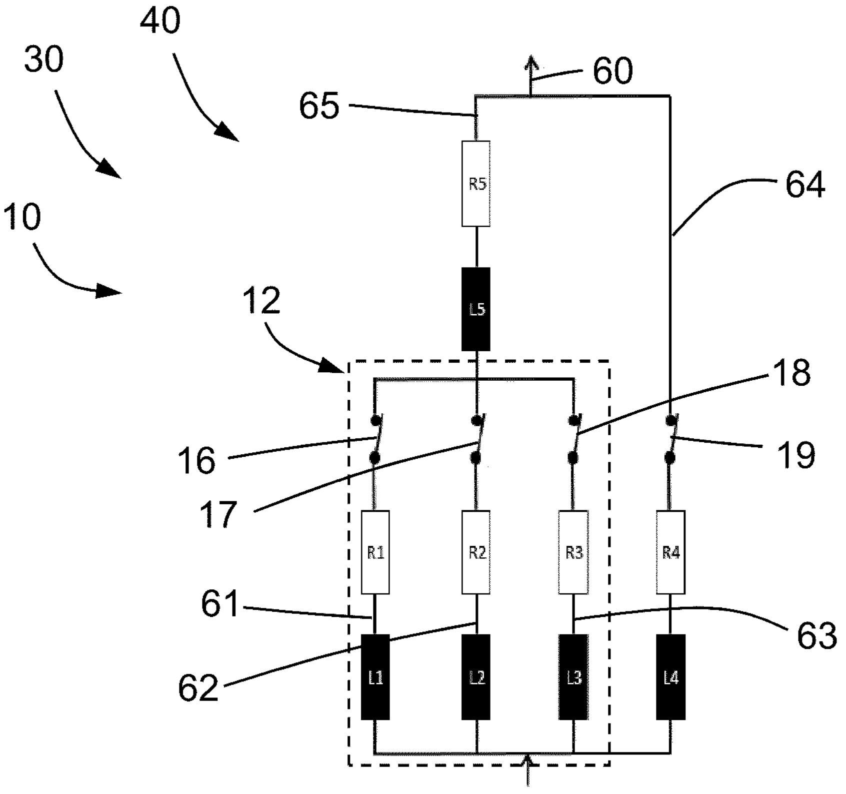
FIG. 4 shows a schematic illustration of an advantageous embodiment of a diverter switch.

FIG. 4 shows a schematic illustration of an advantageous embodiment of a diverter switch 30. The diverter switch 30 has a switch 10 with at least one contact unit 12, which can be designed according to FIGS. 1 to 3, and five current paths, the number of current paths in the diverter switch 30 not being limited to five. A first current path 61 which comprises the moving contacts 16 of the contact unit 12 and has a first resistance R1 and a first impedance L1, a second current path 62 which comprises the first arcing contact 17 of the contact unit 12 and has a second resistance R2 and a second impedance L2, a third current path 63 which comprises the second arcing contact 18 of the contact unit 12 and has a third resistance R3 and a third impedance L3, a fourth current path 64 which comprises a vacuum interrupter 19 and has a fourth resistance R4 and a fourth impedance L4, and a fifth current path 65 which connects the switch 10 to a take-off lead 60 and has a fifth resistance R5 and a fifth impedance L5.

Figure 5:
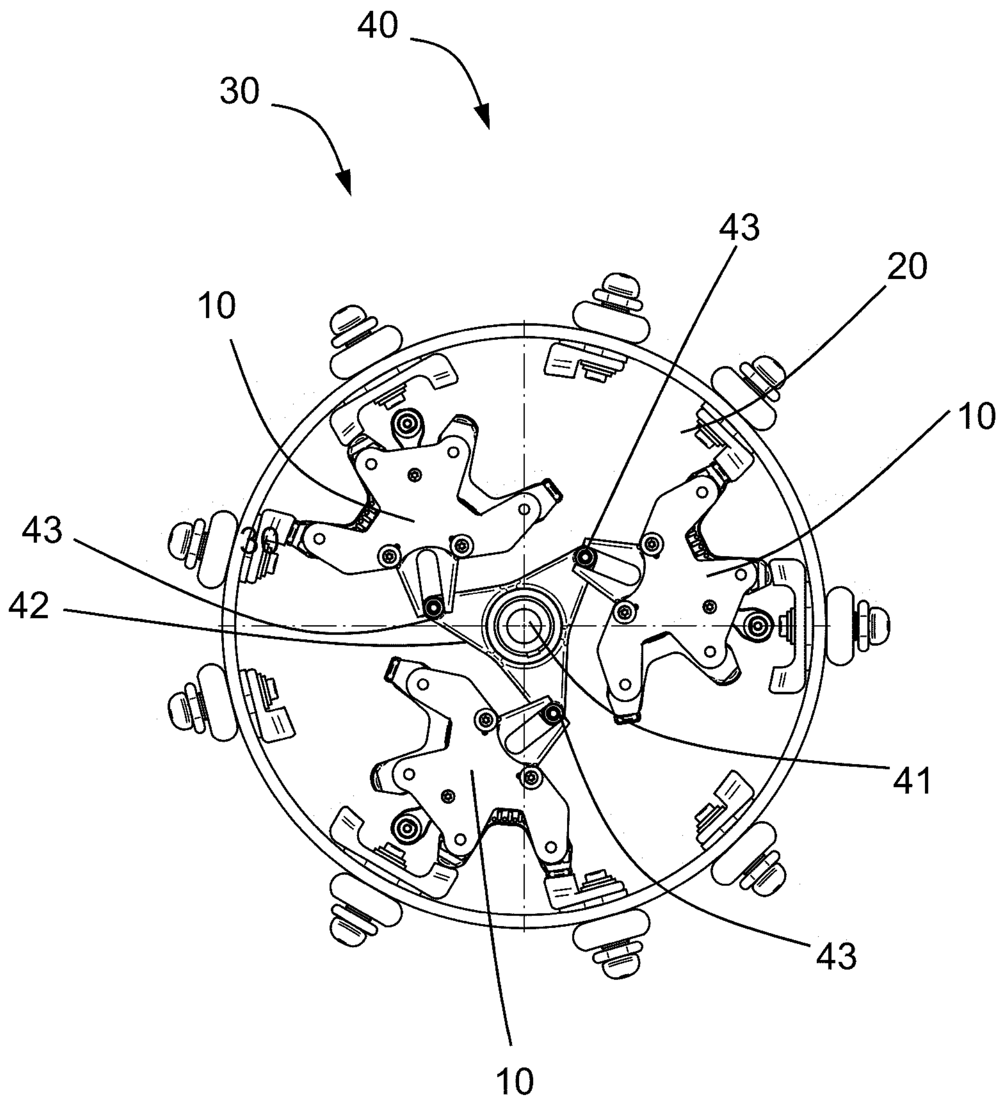
FIG. 5 shows a plan view of a further advantageous embodiment of the diverter switch.

FIG. 5 shows a plan view of a further advantageous embodiment of the diverter switch 30. This embodiment is similar to the embodiments that have been described with reference to FIGS. 1 and 2, and therefore primarily the differences will be explained in more detail below.

In this embodiment, the diverter switch 30 has three sectors, each with a switch 10. With regard to the switches 10, reference is made to the previous explanations in an analogous manner. A drive roller 43 is arranged in each of the corners of the driver 42. The three drive rollers 43 and the three switches 10 are arranged offset through 120° around the switching shaft 41 and are actuated synchronously by rotating the switching shaft 41.

It is assumed that the present disclosure and many of the attendant advantages thereof can be understood from the above description. Furthermore, it is clear that various changes can be made to the shape, construction and arrangement of the components without departing from the disclosed subject matter or without sacrificing all material advantages. The embodiment described is merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

10 Switch
12 Contact unit
13 Take-off contact
14 Primary fixed contact
15 Secondary fixed contact
16 Moving contacts
17 First arcing contact
18 Second arcing contact
19 Vacuum interrupter
20 Contact carrier
201 First supporting plate
202 Second supporting plate
21 Pivot axis
22 Axis of symmetry
23 Contact regions
30 Diverter switch
31 Elongate holes
32 Guide pin
37 Second contact unit
38 Third arcing contact
39 Fourth arcing contact
40 On-load tap-changer
41 Switching shaft
42 Driver
43 Drive roller
44 Contact cylinder
45 Base plate
46 Compression springs
50 Lever
501/502/503 Arms of lever 50
51 Fork
52 Cutouts
60 Take-off lead
61 First current path
62 Second current path
63 Third current path
64 Fourth current path
65 Fifth current path
R1, R2, R3, R4, R5 Resistances of 61 to 65
L1, L2, L3, L4, L5 Impedances of 61 to 65

The invention claimed is:

1. A switch for an on-load tap-changer of a tap-changing transformer, the switch comprising:

a take-off contact;

a primary fixed contact;

at least one contact unit comprising a plurality of contacts comprising a moving contact, a first arcing contact and a second arcing contact, the plurality of contacts being configured to be pivoted about a pivot axis during a switchover process of the switch in such a way that the plurality of contacts can each assume a first position, in which the plurality of contacts respectively make contact with the take-off contact and the primary fixed contact, and a second position, in which the plurality of contacts respectively are separated from the take-off contact and the primary fixed contact, wherein the moving contact is positioned between the second arcing contact and the first arcing contact;

wherein the second arcing contact is configured to assume the first position before the first arcing contact when switching over from the second position to the first position and is configured to leave the first position after the first arcing contact when switching over from the first position to the second position, wherein the moving contact, the second arcing contact, and the first arcing contact are biased towards the take-off contact or the primary fixed contact, and wherein the second arcing contact is biased farther towards the take-off contact or the primary fixed contact than the first arcing contact.

2. The switch as claimed in claim 1, wherein the first arcing contact is configured to assume the first position before the moving contact when switching over from the second position to the first position and is configured to leave the first position after the moving contact when switching over from the first position to the second position.

3. The switch as claimed in claim 1, wherein the moving contact, the first arcing contact, and the second arcing contact consist of different materials which have a different electrical conductivity.

4. The switch as claimed in claim 1, wherein the moving contact, the first arcing contact, or the second arcing contact have a different geometric shape.

5. The switch as claimed in claim 1, wherein the moving contact, the first arcing contact, and the second arcing contact each have contact regions by way of which the plurality of contacts respectively rest against the take-off contact and the fixed contact in the first position.

6. The switch as claimed in claim 1, wherein the first arcing contact and the second arcing contact are arranged relative to the moving contact in such a way that at least one contact region of the first arcing contact or of the second arcing contact protrudes in relation to the contact regions of the moving contact in the second position.

7. The switch as claimed in claim 1, comprising:

a contact carrier comprising a first supporting plate and a second supporting plate that is arranged parallel to the first supporting plate; and at least one further moving contact, wherein:

the moving contact, the further moving contact, the first arcing contact, and the second arcing contact are fitted to the supporting plates and are arranged between the supporting plates.

8. The switch as claimed in claim 1, wherein:

the moving contact, the first arcing contact, and the second arcing contact are arranged in a stack in the contact carrier and each have parallel elongate holes situated one above the other; and the moving contact, the first arcing contact, and the second arcing contact are fitted movably between the supporting plates by guide pins which pass through the elongate holes.

9. The switch as claimed in claim 1, wherein the guide pins together with the elongate holes form a mechanical stop for the moving contact, the first arcing contact, and the second arcing contact during the switchover process of the switch.

10. The switch as claimed in claim 1, wherein the elongate holes of the moving contact, of the first arcing contact, and of the second arcing contact are each of different lengths in such a way that the moving contact, the first arcing contact and the second arcing contact reach the mechanical stop at different points in time during the switchover process of the switch.

11. The switch as claimed in claim 1, wherein the moving contact, the first arcing contact, and the second arcing contact are arranged on the contact carrier in such a way that the plurality of contacts are preloaded in a resilient manner against the take-off contact and the primary fixed contact in the first position.

12. The switch as claimed in claim 1, wherein the moving contact, the first arcing contact, and the second arcing contact are arranged in a stack in such a way that the moving contact is arranged between the first arcing contact and the second arcing contact.

13. The switch as claimed in claim 1, comprising a secondary fixed contact and a second contact unit which, with respect to an axis of symmetry which runs through the pivot axis, is arranged symmetrically to the contact unit and comprises a third arcing contact, which is identical to the first arcing contact, and a fourth arcing contact, which is identical to the second arcing contact, wherein the fourth arcing contact lies on a plane with the first arcing contact and the third arcing contact lies on a plane with the second arcing contact.

14. The switch as claimed in claim 1, in the form of a permanent main switch or in the form of a disconnecting switch for or in a diverter switch of an on-load tap-changer.

15. A diverter switch for or in an on-load tap-changer of a tap-changing transformer, the diverter switch comprising:

the switch as claimed in claim 1;

a first current path which comprises the moving contact of the switch;

a second current path which comprises the first arcing contact of the switch;

a third current path which comprises the second arcing contact of the switch;

a fourth current path which comprises at least one vacuum interrupter; and a fifth current path which connects the switch to a take-off lead, wherein:

the first current path has a resistance, the second current path has a resistance which is greater than the resistance of the first current path, and the third current path has a resistance which is greater than the resistance of the second current path.

16. The diverter switch as claimed in claim 15, wherein the resistance of the second current path and the resistance of the third current path are determined using a material of the respective arcing contactor using the geometric shape of the respective arcing contact.

* * * * *